US012674388B2

(12) United States Patent
Lei et al.

(10) Patent No.: US 12,674,388 B2
(45) Date of Patent: Jul. 7, 2026

(54) AUTOMATIC BOREHOLE SONIC CLASSIFICATION METHOD AND APPARATUS

(71) Applicant: Schlumberger Technology Corporation, Sugar Land, TX (US)

(72) Inventors: Ting Lei, Cambridge, MA (US); Daniel Al Choboq, Lyons (FR); Josselin Kherroubi, Clamart (FR); Lin Liang, Cambridge, MA (US); Romain Prioul, Cambridge, MA (US); Gurami Keretchashvili, Clamart (FR); Pontus Loviken, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 141 days.

(21) Appl. No.: 18/709,883

(22) PCT Filed: Nov. 16, 2022

(86) PCT No.: PCT/US2022/050030
§ 371 (c)(1),
(2) Date: May 14, 2024

(87) PCT Pub. No.: WO2023/091440
PCT Pub. Date: May 25, 2023

(65) Prior Publication Data
US 2025/0012184 A1      Jan. 9, 2025

Related U.S. Application Data

(60) Provisional application No. 63/279,955, filed on Nov. 16, 2021.

(51) Int. Cl.
| | |
|---|---|
| *E21B 47/12* | (2012.01) |
| *G01V 1/50* | (2006.01) |
| *G06N 20/20* | (2019.01) |

(52) U.S. Cl.
CPC ............... *E21B 47/12* (2013.01); *G01V 1/50* (2013.01); *G06N 20/20* (2019.01); *G01V 2210/626* (2013.01)

(58) Field of Classification Search
CPC ...... G01V 1/50; G01V 2210/626; G01V 1/48; G01V 1/306; G01V 2210/582; E21B 47/12; G06N 3/0442; G06N 3/0464; G06N 5/01

(Continued)

(56) References Cited

U.S. PATENT DOCUMENTS

| | | | |
|---|---|---|---|
| 2002/0183930 A1* | 12/2002 | Plona ...................... | G01V 1/48 |
| | | | 702/6 |
| 2017/0102475 A1* | 4/2017 | Mukhopadhyay ....... | G01V 1/48 |

(Continued)

FOREIGN PATENT DOCUMENTS

WO        2020252419 A1    12/2020

OTHER PUBLICATIONS

Donald, J.A. et al., "Wellsite Full Waveform Sonic Interpretation" SPWLA 62nd Annual Logging Symposium, SPWLA-2021-0022, May 17, 2021, pp. 1-12.

(Continued)

*Primary Examiner* — Yuqing Xiao
*Assistant Examiner* — Christopher Richard Walker
(74) *Attorney, Agent, or Firm* — Jeffrey D. Frantz

(57) ABSTRACT

A general-purpose workflow for automatic borehole sonic data classification to identify data into different physical categories and logging conditions, which are traditionally manually evaluated. The workflow uses machine learning techniques and physical knowledge for data classification, including pre-processing the high-dimensional high-quality dispersion modes extracted using a recently developed physical-driven ML enabled approach.

21 Claims, 8 Drawing Sheets

(58) Field of Classification Search
USPC .......................................................... 367/25
See application file for complete search history.

(56) References Cited

U.S. PATENT DOCUMENTS

| | | | |
|---|---|---|---|
| 2017/0115413 A1* | 4/2017 | Wang | G01V 1/282 |
| 2018/0149019 A1* | 5/2018 | Bose | G01V 1/50 |
| 2021/0333428 A1* | 10/2021 | Wang | G01V 1/282 |
| 2022/0252750 A1* | 8/2022 | Wang | G01V 1/284 |

OTHER PUBLICATIONS

Ekstrom, M.P. "Dispersion Estimation From Borehole Acoustic Arrays Using a Modified Matrix Pencil Algorithm" Conference Record of the Twenty-Ninth Asilomar Conference on Signals, Systems and Computers, vol. 1, Oct. 30, 1995, pp. 449-453.
Liang, L. et al., "Machine-Learning-Enabled Automatic Sonic Shear Processing" SPWLA 61st Annual Logging Symposium, Petrophysics, Jun. 1, 2021, pp. 282-295, vol. 62, No. 3.

* cited by examiner

AUTOMATIC BOREHOLE SONIC CLASSIFICATION METHOD AND APPARATUS

CROSS-REFERENCE TO RELATED APPLICATIONS

The current application is a National Stage Entry of International Application No. PCT/US2022/050030, filed Nov. 16, 2022, which claims priority to U.S. Provisional Application 63/279,955 filed Nov. 16, 2021, the entirety of which is incorporated by reference.

FIELD OF THE DISCLOSURE

Aspects of the present disclosure generally relate to a general-purpose workflow for automatic borehole sonic data classification to identify data into different physical categories and logging conditions.

DESCRIPTION OF THE RELATED ART

Traditionally, borehole sonic dispersion data is often noisy; and the evaluation requires manual dispersion analysis or estimate depth-by-depth evaluation. The traditional processes are time-consuming and require exacting calibration on mud velocity and borehole calipers.

Conventionally, attempts are made evaluate different performance and technical data of geological stratum. Conventionally, these attempts can be capital resource intensive as noise from running machinery must be quieted in order to obtain better data.

There is a need, therefore, limiting noise associated with sonic dispersion data to provide for better quality results.

There is a further need to to be able to distinguish between different types of sonic data to characterize mechanical formation properties.

There is a further need for a general-purpose workflow for automatic borehole sonic data classification to identify data into different physical categories and logging conditions.

There is a still further need to be able to not only classify data into physical categories, but to be able to perform such analysis in a detailed and organized manner to allow operators flexibility in performing analysis.

There is a still further need to be able to classify data and process data related to sonic data in a quick and efficient manner that is superior to conventional processes.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

Example embodiments of the disclosure are provided next. In one example embodiment, a method of automatically classifying sonic data is disclosed, comprising obtaining a set of sonic data from a borehole analysis and using a dispersion analysis method, processing the set of sonic data from the borehole. The method may also comprise determining scattered dispersion points from the processing and extracting the scattered dispersion points as a smooth curve, which is a physical based dispersion curve honoring either heterogeneity or anisotropy. The method may also comprise obtaining an equivalent isotropic and homogeneous curve for the set of sonic data from the borehole analysis and inputting the smooth curve and the equivalent isotropic and homogeneous curve into a classifier. The method may also comprise outputting dispersion types of the sonic data from the classifier.

In another example embodiment, a method of automatically classifying data is disclosed. The method may comprise obtaining a set of data from a borehole analysis; and using a dispersion analysis method, processing the set of data from the borehole. The method may also comprise determining scattered dispersion points from the processing of the set of data from the borehole and extracting the scattered dispersion points as a smooth curve (the physical based curve) through a machine-learning automatic dipole interpretation approach. The method may also comprise obtaining an equivalent isotropic and homogeneous curve for the set of data from the borehole analysis and inputting the smooth curve and the equivalent isotropic and homogeneous curve into a classifier. The method may also comprise performing a synthetic dispersion analysis and feeding results to the classifier and outputting dispersion types of the data from the classifier.

In another example embodiment, a computer readable storage medium having data stored therein representing software executable by a computer, the software including instructions for classifying data per a method is disclosed. The method may comprise obtaining a set of data from a borehole analysis, using a dispersion analysis method, processing the set of data from the borehole, determining scattered dispersion points from the processing of the set of data from the borehole and extracting the scattered dispersion points as a smooth curve (the physical based curve) through a machine-learning automatic dipole interpretation approach. The method may further comprise obtaining an equivalent isotropic and homogeneous curve for the set of data from the borehole analysis and inputting the smooth curve and the equivalent isotropic and homogeneous curve into a classifier. The method may also comprise performing a synthetic dispersion analysis and feeding results to the classifier; and outputting dispersion types of the data from the classifier.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

Figure 1A:
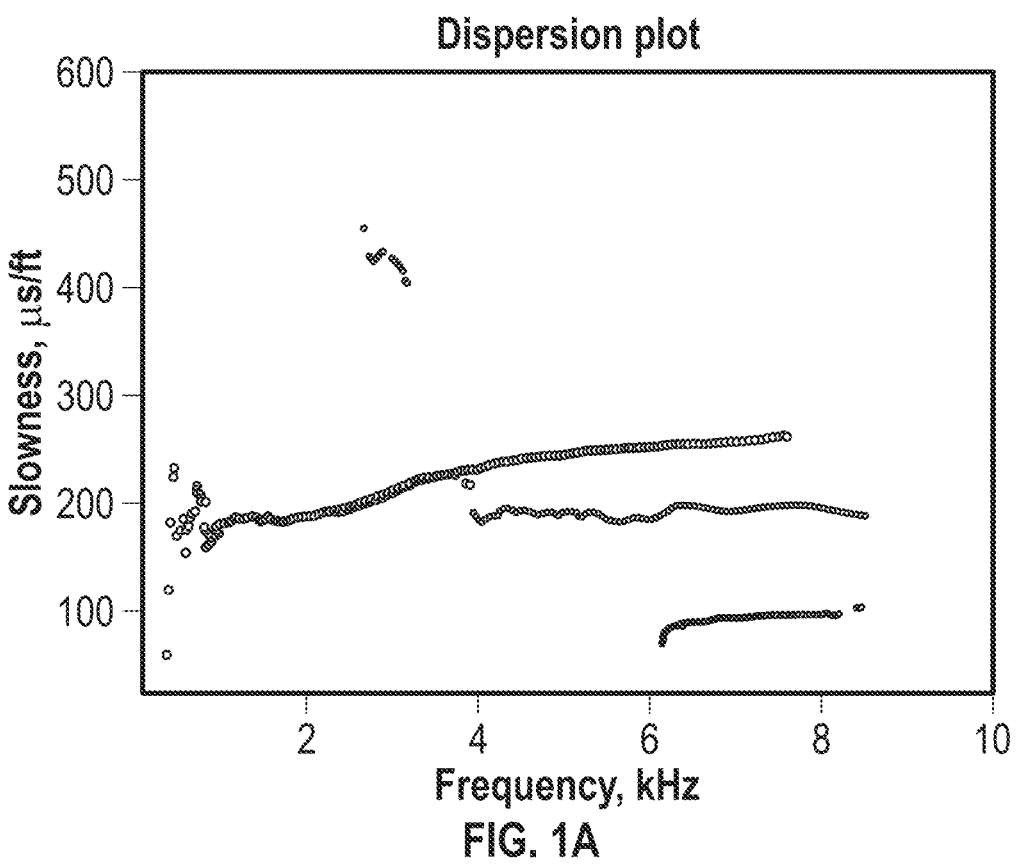
FIG. 1A shows on the top, a typical dispersion plot obtained after processing using the modified Prony's method or other dispersion analysis methods, before applying a machine-learning enabled automatic dipole interpretation (MLADI) method. On the bottom (FIG. 1B) a flexural mode after applying the MLADI method: labeled and inverted after filtering out non-flexural modes. The reconstructed flexural dispersion curve is shown in dotted curve.
Figure 1B:
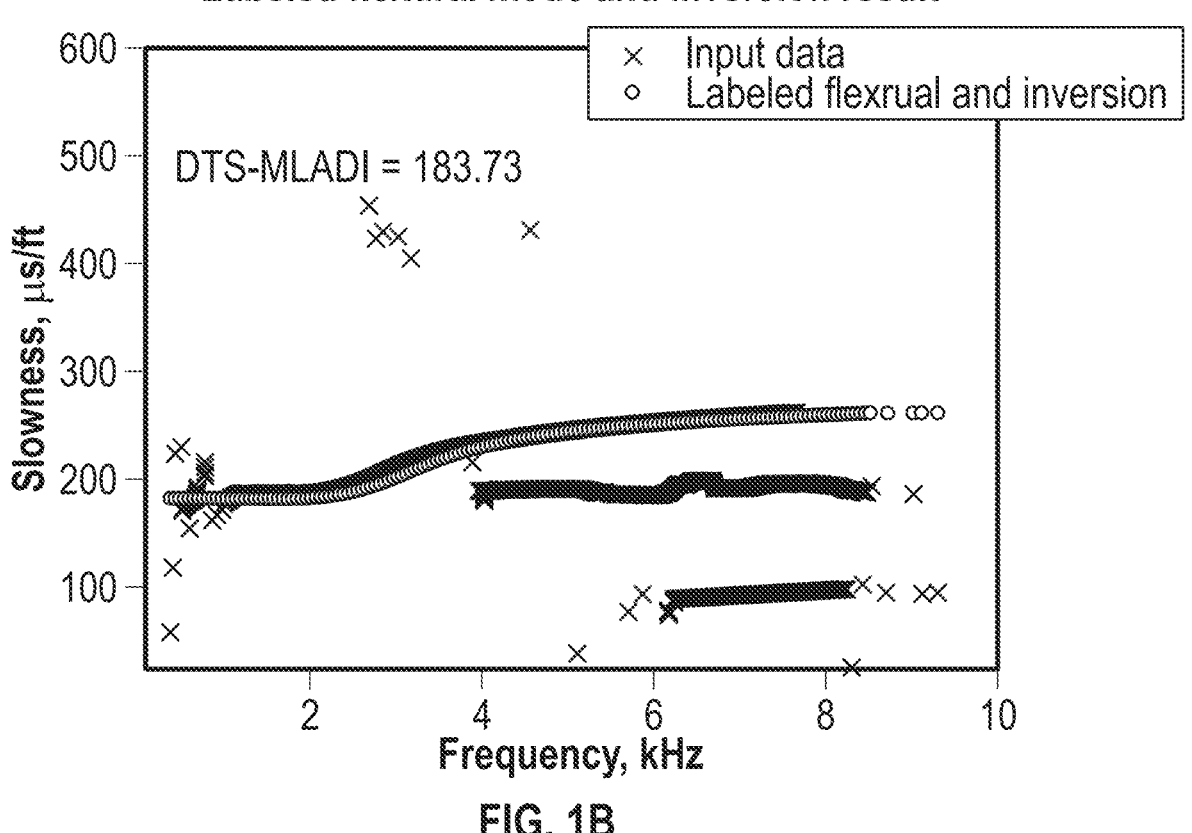

The disclosed workflows can include using a machine-learning automatic dipole interpretation approach ("MLADI"). As depicted in FIG. 1, the MLADI curves can be classified into dispersions types, representing different formation types and logging conditions. The classification is conducted by evaluation of a fast and a slow MLADI curve, as well as their equivalent isotropic and homogeneous ("EIH") curves. The fast and slow curves represent measurement along two orthogonal azimuths in the wellbore cross-section plane. They are obtained from cross-dipole transmitters of a dipole sonic logging tool. The fast and slow EIH curves are theoretical dispersion curves assuming the formation is isotropic and homogeneous. Consequently, algorithms for this workflow take these flexural dispersion curves as input and output formation types and logging conditions for each logging depth. Referring to FIG. 1A, a typical dispersion plot obtained after processing using the modified Prony's method or other dispersion analysis method, before applying MLADI. On FIG. 1B a flexural mode after applying MLADI: labeled and inverted after filtering out non-flexural modes. The reconstructed flexural dispersion curve is shown in blue.

Figure 2:
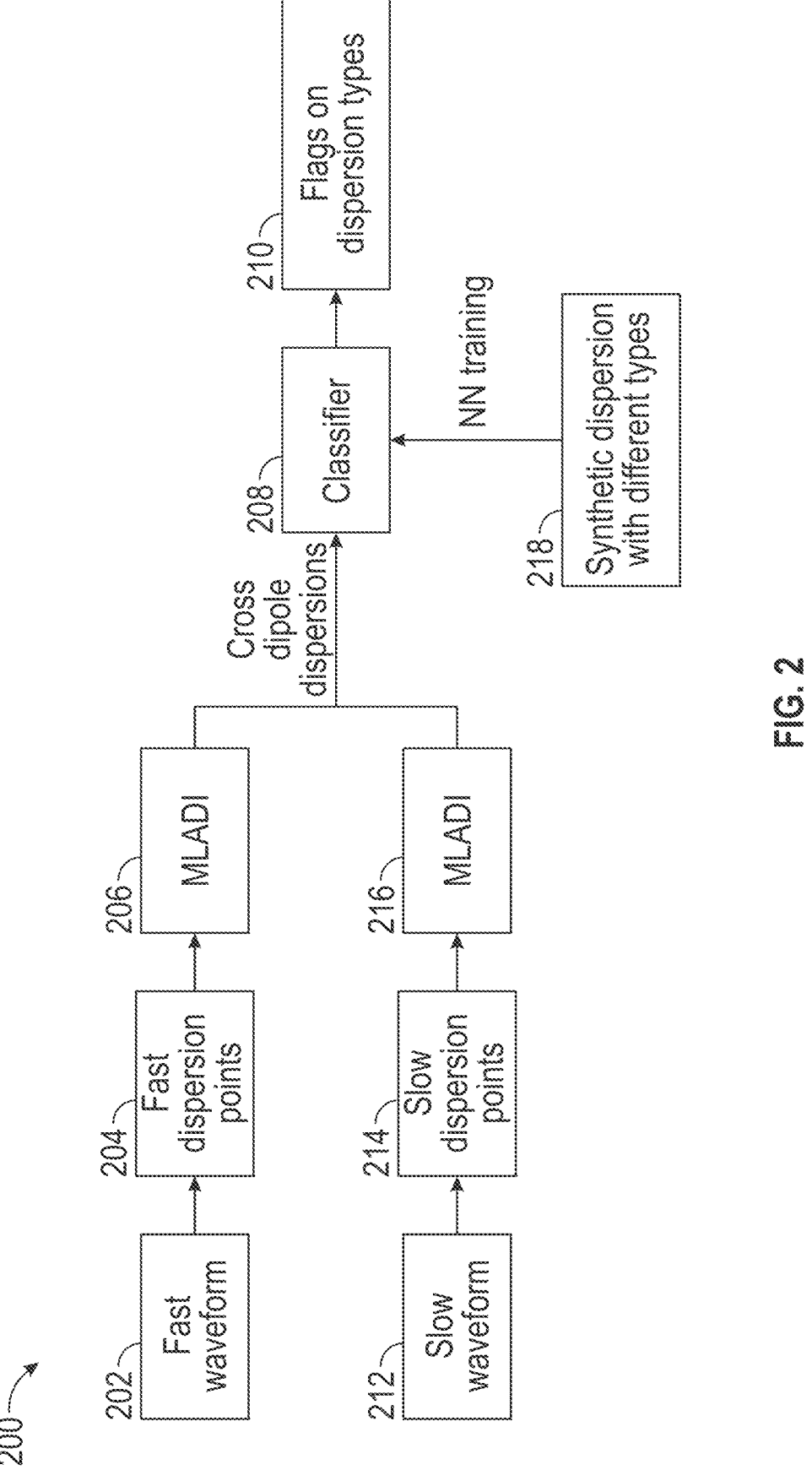
FIG. 2 depicts an embodiment of an overall workflow on dispersion type classification using artificial intelligence.

FIG. 2 shows the overall workflow 200 on sonic dispersion type classification using artificial intelligence ("AI"). The fast and slow dipole waveforms are first processed using dispersion analysis methods (e.g., the modified Prony's method) to obtain scattered dispersion points, and then the scattered points are extracted as a smooth curve using the MLADI method. The MLADI curves and their corresponding EIH curves are then input into the AI classifier and the AI classifier outputs the flag on the dispersion types. In FIG. 2, at 202, for a fast waveform, the method proceeds to 204, where fast dispersion points are determined. At 206, MLADI analysis occurs, as described above. At 208, cross dipole dispersions are fed into a classifier. At 218, synthetic dispersion analysis is performed with the results being fed into step 208, where classification occurs. Results from the classification at 208 produce flags on dispersion types at 210. For slow waveforms, at 212, data is fed into 214 where slow dispersion points are evaluated. At 216, MLADI analysis occurs with the results from 214 and resulting information is fed into the classifier at 208.

The AI classifier can be pre-trained using large volume of synthetic cross-dipole dispersions.

Figures 3A, 3B:
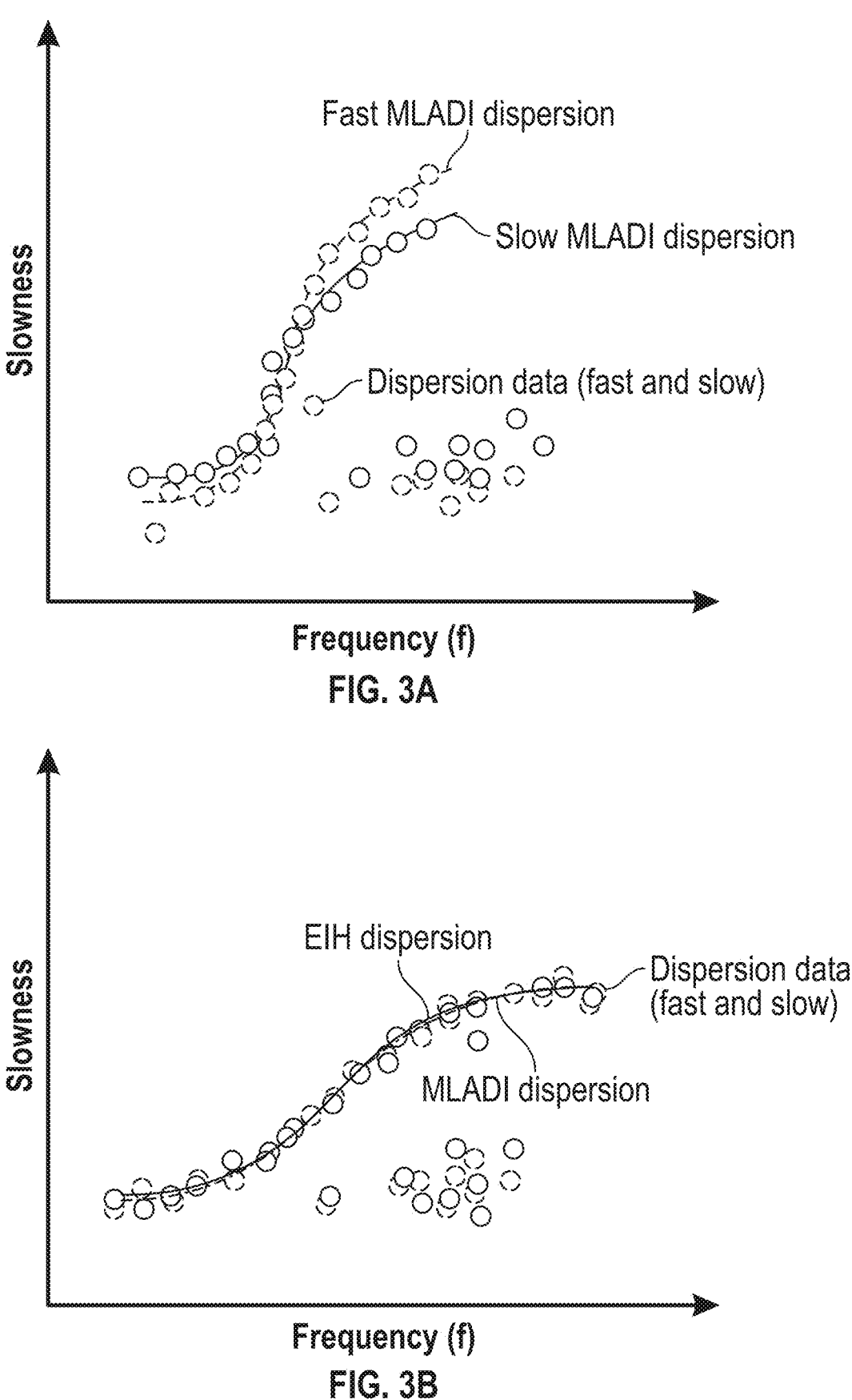
FIG. 3A depicts a dispersion plot representing stress-induced anisotropy (SIA) from the characteristic "cross-over" behavior in a vertical well.
FIG. 3B depicts a dispersion plot representing an isotropic homogenous formation in either a vertical or horizontal well.

FIGS. 3 to 5 illustrate some types of dispersion examples. FIG. 3(*a*) shows a cross-over signature between fast and slow dispersion curves. The fast dispersion is below (or faster than) the slow dispersion at low frequencies and above (or slower than) the slow dispersion at high frequencies. This signature is caused by formation stress concentration and can be used as an indicator of stress-induced anisotropy (SIA). Note that in some cases, due to loss of signal at high frequencies, the high frequency part of MLADI curves may be missing, resulting in a tendency of a 'cross-over' signature. FIG. 3B shows an overlay signature between fast and slow dispersion curves. Additionally, the MLADI curves also overlay with their corresponding EIH curves (shown as dashed lines). The signature that the four curves overlay represents that the formation is isotropic (ISO) and homogeneous, and the borehole is circular with the logging tool well centered. Referring to FIG. 3A, a dispersion plot representing SIA from the characteristic "cross over" behavior in a vertical well, while, (at right), a dispersion plot representing an isotropic homogenous formation in either a vertical or horizontal well.

Figures 4A, 4B:
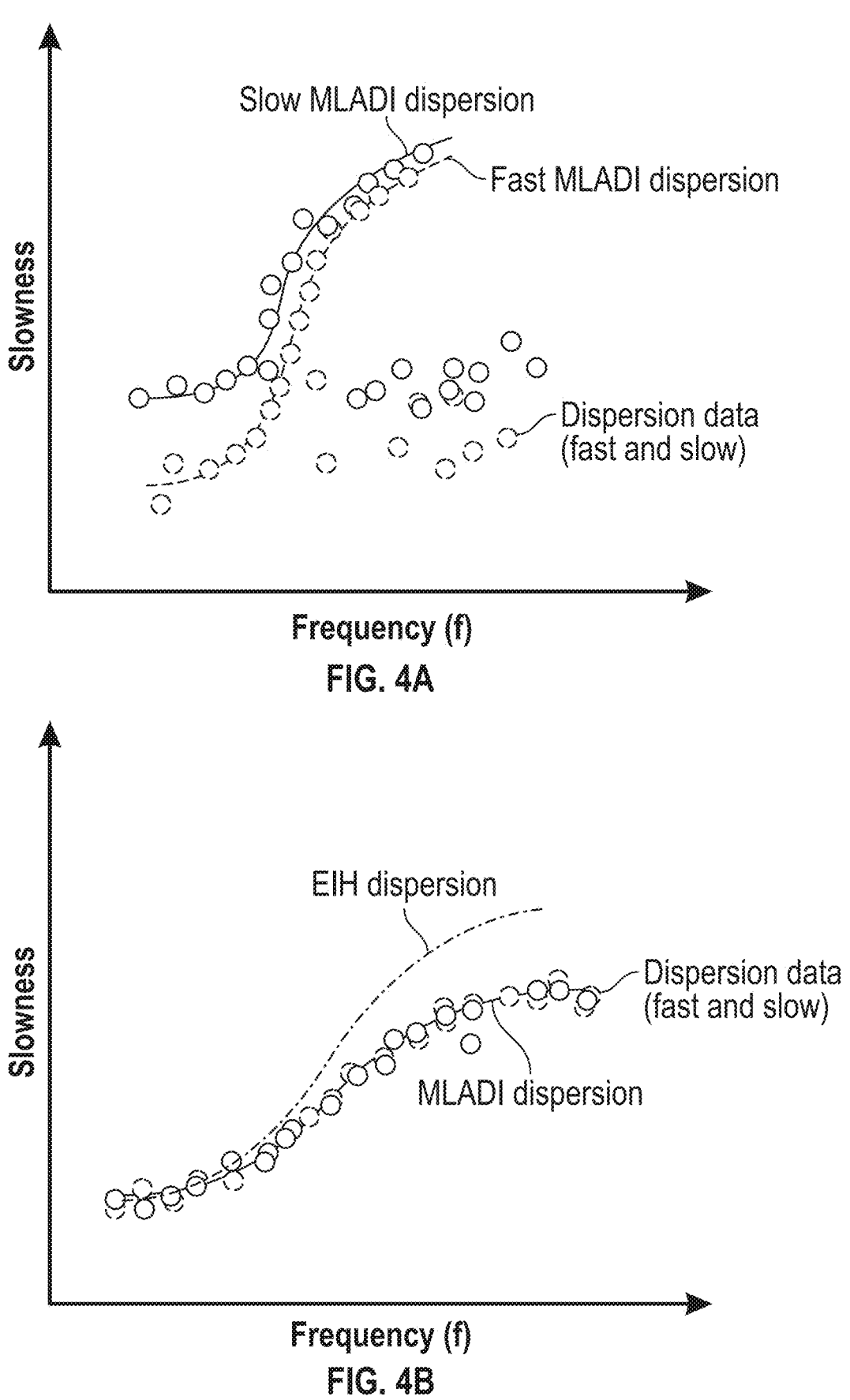
FIG. 4A depicts a dispersion plot representing VTI anisotropy in a deviated well (TTI).
FIG. 4B depicts a dispersion plot representing VTI anisotropy in a vertical well (VTI).

FIG. 4A shows a splitting signature where the fast MLADI is below the slow MLADI over the entire frequency ranges. This signature is often associated with the formation being anisotropic and the wellbore being deviated. This type is also call tilted transverse isotropy ("TTI"). FIG. 4B shows an overlay between the fast and slow MLADI dispersions. However, they are flatter than their corresponding EIH curves (dashed), which means that the high frequency part of MLADI dispersion is below (or faster than) the EIH dispersion and the low frequency asymptote is the same as the EIH curves. This signature is associated with the formation being anisotropic and the wellbore being vertical. This type is also called vertical transverse isotropy ("VTI").

Figures 5A, 5B:
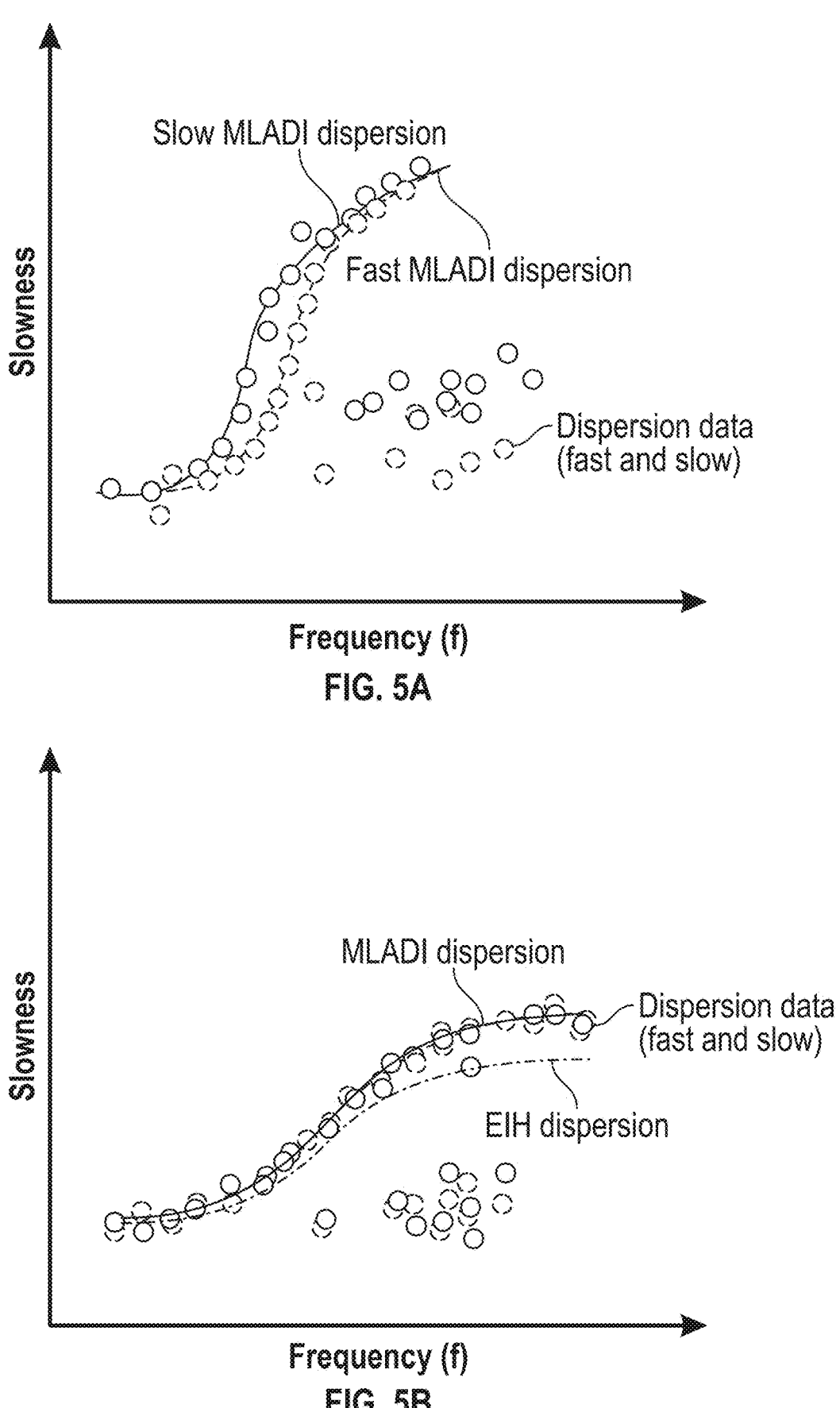
FIG. 5A depicts a dispersion plot representing Borehole Ovality (BHO).
FIG. 5B depicts a dispersion plot representing overlay with alteration or gas (OAG).

FIG. 5A shows a splitting signature where the fast MLADI is below (or faster than) the slow MLADI in the middle or high frequency ranges. The 2 curves asymptote to the same slowness at low frequencies. Such a signature is often associated with an oval shaped borehole or a logging tool not centered in the borehole. This is referred as type of borehole ovality (BHO). FIG. 5B shows an overlay between the fast and slow MLADI dispersions. However, they are steeper than their corresponding EIH curves (dashed), which means that the high frequency part of MLADI dispersion is above (or slower than) the EIH dispersion and the low frequency asymptote is the same as the EIH curves. This signature is associated with the formation being altered in the near wellbore region or gas leaked into the drilling fluid. This type is referred as overlay with alteration or gas (OAG) Regarding FIG. 6, an example architecture of one embodiment of the disclosure is provided.

In one or more embodiments, the workflow combines fast/slow dispersion curves and their EIH curves, one can evaluate different formation types and logging conditions based on the full frequency band dispersion signature. In the next step, a machine-learning-based classifier is used to automatically flag dispersion with above mentioned types. The neural network is trained with large volume of dispersion data showing signatures of different types and with different borehole sizes, mud types, formation types, etc.

In one or more embodiments, the training data can be synthetic data or labelled field data. The field data can be manually labeled. The synthetic data can be generated with a known type, such as SIA, VTI, TTI, OAG, ISO and BHO, etc. A model can be trained with the labeled synthetic or field data using supervised learning or other now known or future known methods.

In one or more embodiments the training data can be generated using physical models, such as an Annie model or an alteration model. The inputs are physical parameters (such as borehole diameter, mud slowness, mud density, formation shear, Poisson's ratio, Thomson gamma, alteration radius, alteration zone shear, etc.). These parameters are randomly sampled using Latin Hypercube Sampling (LHS). For each fast and slow parameter as inputs, we will get as output of 4 dispersion curves (Fast, Slow, Fast EIH, and Slow EIH), using a forward modeling algorithm such as a root-finding mode search method. The foregoing can provide four dispersion curves with their formation type label for each type.

The parameter combinations can be chosen based on formation types and logging conditions. Parameter selection is illustrated in Table 1. In Table 1, the 1st row shows the dispersion types, the 2nd row shows the parameter selection, and the 3rd row shows a typical dispersion curve. For example, to generate a cross-over dispersions, a fast dipole can be set with a larger alteration and slow dipole with a smaller alteration. In another example, to get the VTI type dispersions, larger value can be set for Thomson gamma for both fast and slow dispersion. Note that in all the types, the corresponding EIH curves can be simply obtained by setting parameters like alteration zone shear and Thomson gamma to zero. In practice, the synthetic data can also be refined with more dispersion types. For example, for the VTI type, by setting different levels of Thomsen Gamma (relatively small, relatively large, very large), we can generate weak VTI, moderate VTI and strong VTI. The same approach can also be applied to other types, such as to generate weak, moderate, strong SIA. Accordingly, the classifier can also output dispersion types of these refined types. Additionally, if a weak type is classified, a second type can be given as a co-existing type. This is achieved by the ML classifier, which can give a value of likelihood for each category. Consequently, the largest value is the first type and the second largest value is the second type in the classification.

Figure 6A:
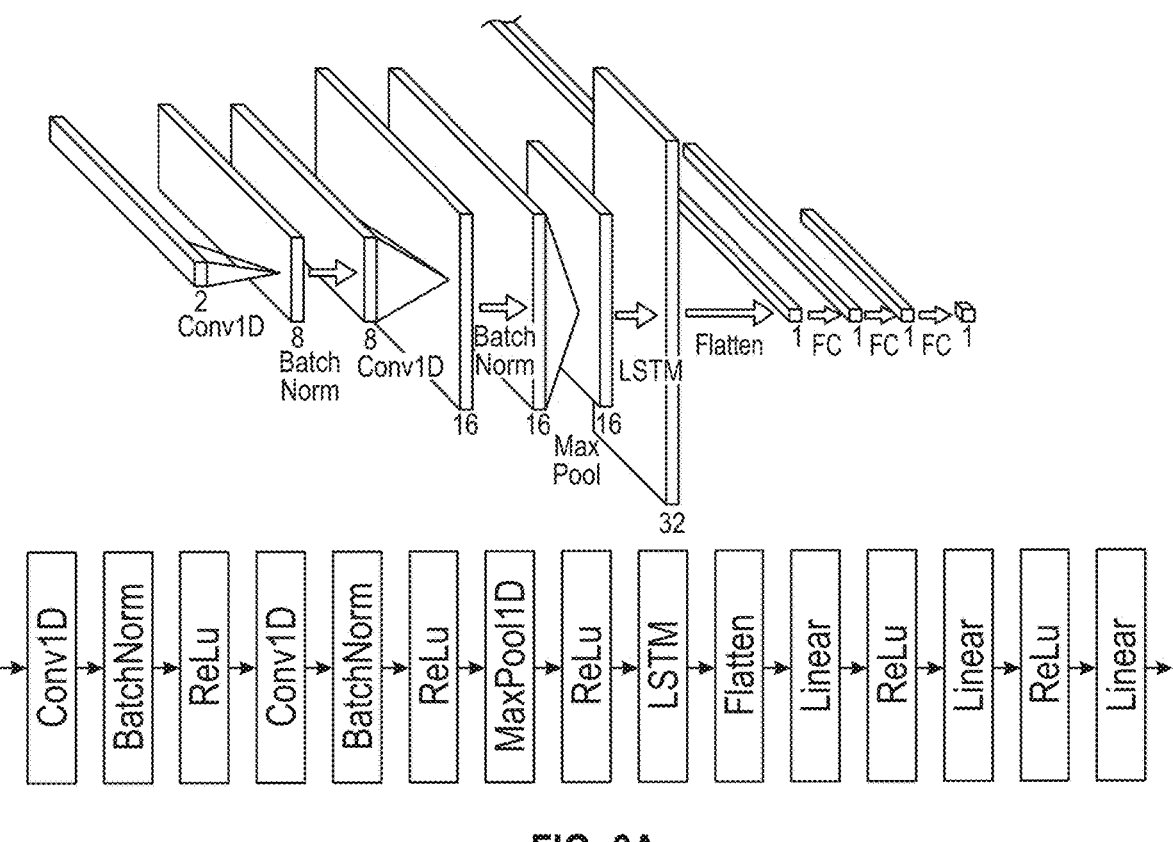
FIG. 6A depicts an example architecture of NN.
Figure 6B:
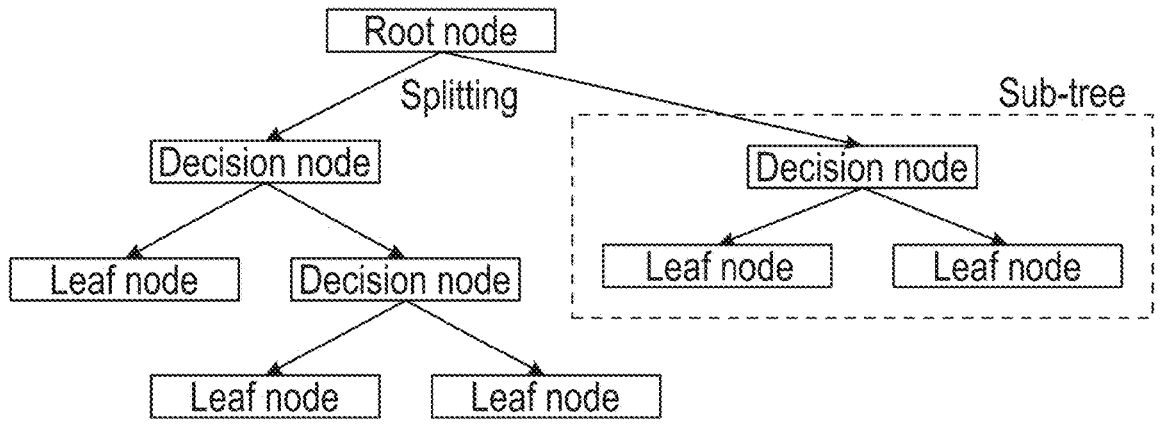
FIG. 6B depicts an example of extreme gradient boosting trees.

The network architecture used in the training takes as input 2 MLADI curves and generates as output the formation type. In one example, it may consist first of some convolutional layers with batch normalization that detects the shapes of the time series, then an LSTM and finally some fully connected layers to do the classification (FIG. 6A). In another example, it may consist the Extreme Gradient Boosting trees, for which we build sequential trees and ensemble them to make combined predictive power of multiple trees (FIG. 6B). It is important to note, however, that these machine-learning methods should yield the same good classification results if the models are tuned with correct hyper-parameters and are well validated.

In embodiments, 2 MLADI curves may be used instead of 4 (i.e., 2 MLADI and 2 EIH) to make the workflow less complicated for the network. To do this a successive classification can be performed instead of only one. At first stage, only fast and slow MLADI dispersion are used and classify data as 'overlaying', 'cross-over', 'separate', or 'overlay then separate'. Later a second step classification to classify data into further formation types, so the overlay type will be further separated using the same network into VTI, Isotropic, alteration. The "overlay then separate" type of dispersion will be labeled as Oval (or elliptical) borehole or tool decentralization. The "cross-over" will be labeled as SIA. The "Separate" type will be labeled as TTI if the well deviation is above certain degrees.

Figure 7:
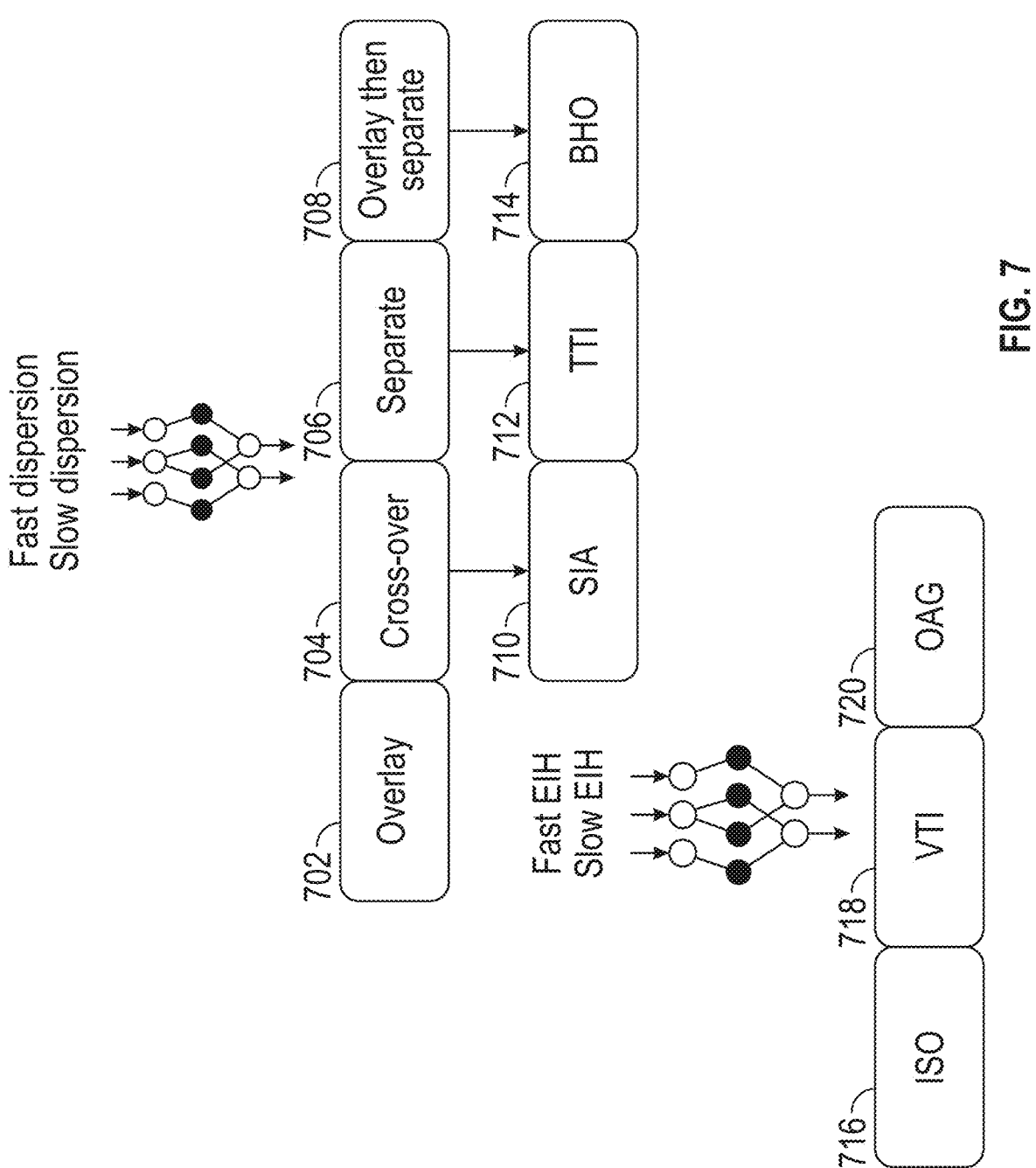
FIG. 7 depicts an example workflow of a two-step classification. First stage to classify into four main groups and a second stage for further detailed classification.

Referring to FIG. 7, a two step classification process is shown. For this classification process, data is received from signals, such as overlay 702, cross-over 704, separate 706 and overlay then separate 708. The classification further proceeds where SIA 710, TTI 712 and oval hole/tool decentralization characteristics 714 are identified. For fast EIH and slow EIH, further classification occurs for isotropic 716, VTI 718 and alteration/gas leaks 720.

Figures 8A, 8B:
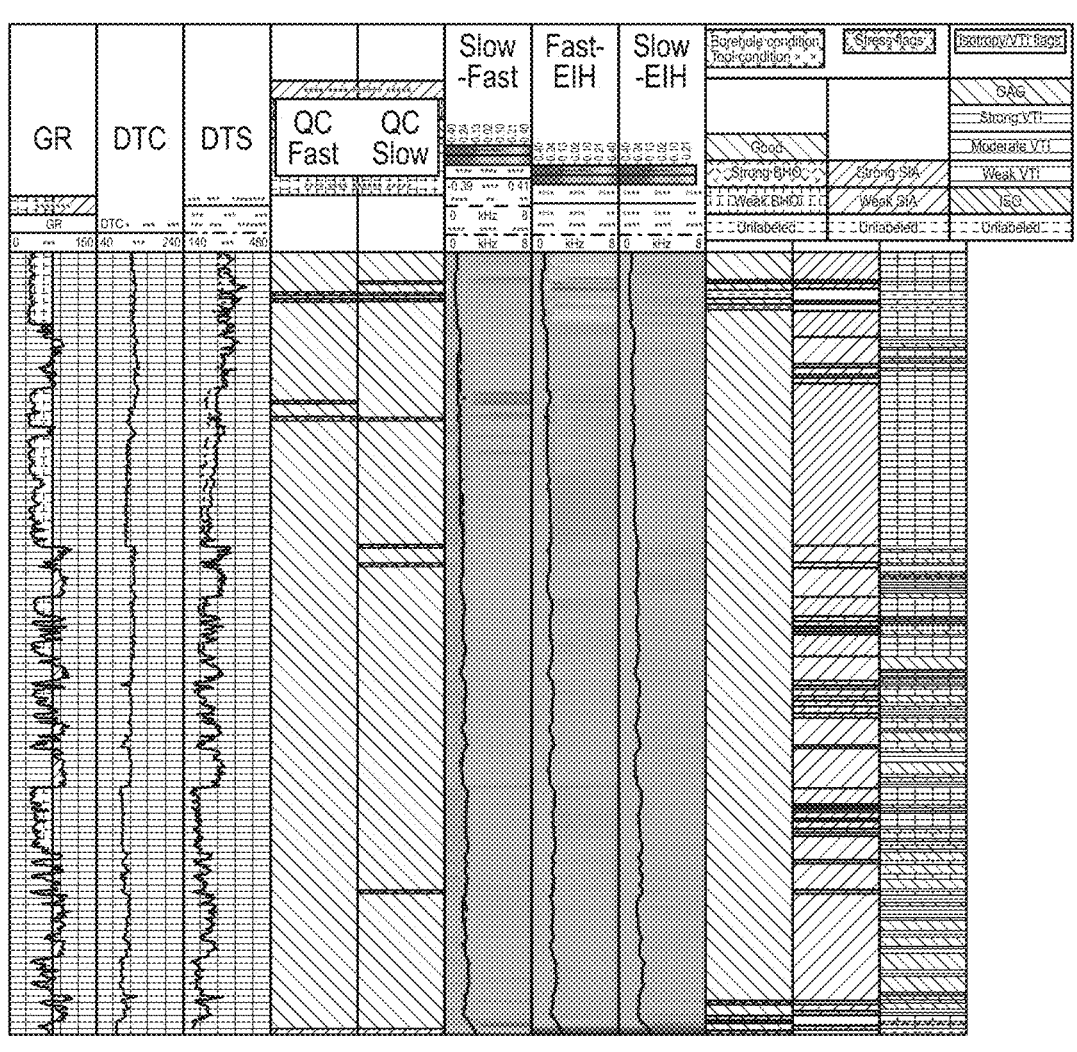
FIG. 8A depicts a field results using the disclosed classification algorithm. The last track on the left shows the classification results, where most depths are classified with flags as cross-over.
FIG. 8B depicts validation results.

The approach was tested and validated on real field well data and it was able to give us the expected result for a well where we have a prior knowledge of which formation types exist in it. The results of the validation were in harmony with other logs, which verifies its efficiency. An example of output from the algorithm is shown in FIG. 8. In FIG. 8A, from left to right, log tracks plot gamma-ray, hole calipers, mud slowness, compressional slowness, fast and slow shear slowness, QC of fast shear, QC of slow shear, difference between slow dispersion and fast dispersion, difference between fast dispersion and EIH dispersion, difference between slow dispersion and EIH dispersion, and 3 tracks with classification flags including borehole conditions (BHO), stress flags (SIA) and Isotropy/VTI flags (OAG, VTI, and ISO). The well is known to have SIA. From the classification flags, we can see the approach correctly labeled 'cross-over' signature. The dispersion cross-over signature is validated from the dispersion plots on the FIG. 8B of a single depth.

Example embodiments of the disclosure are provided next. In one example embodiment, a method of automatically classifying sonic data is disclosed, comprising obtaining a set of sonic data from a borehole analysis and using a dispersion analysis method, processing the set of sonic data from the borehole. The method may also comprise determining scattered dispersion points from the processing and extracting the scattered dispersion points as a smooth curve. The method may also comprise obtaining an equivalent isotropic and homogeneous curve for the set of sonic data from the borehole analysis and inputting the smooth curve and the equivalent isotropic and homogeneous curve into a classifier. The method may also comprise outputting dispersion types of the sonic data from the classifier. As will be understood, output of the analysis may be displayed on a monitor, printed and/or saved for record retention. Operations may be performed on a personal computer, server or other computing device. Storage may occur on a non-transitory medium as necessary.

In another example embodiment, the method may be performed wherein the set of sonic data includes fast and slow dipole waveforms.

In another example embodiment, the method may be performed the processing of the set of sonic data uses Prony's method or other dispersion analysis methods.

In another example embodiment, the method may be performed wherein the extracting the scattered dispersion points as a smooth curve is done using a machine-learning automatic dipole interpretation approach.

In another example embodiment, the method may be performed wherein the classifier is an artificial intelligence based classifier.

In another example embodiment, the method may be performed wherein the artificial intelligence-based classifier is a machine learning artificial intelligence based classifier.

In another example embodiment, the method may further comprise performing a synthetic dispersion analysis prior to the outputting dispersion types of the sonic data from the classifier.

In another example embodiment, the method may be performed wherein the synthetic dispersion analysis is used by the classifier.

In another example embodiment, a method of automatically classifying data is disclosed. The method may comprise obtaining a set of data from a borehole analysis; and using a dispersion analysis method, processing the set of data from the borehole. The method may also comprise determining scattered dispersion points from the processing of the set of data from the borehole and extracting the scattered dispersion points as a smooth curve through a machine-learning automatic dipole interpretation approach. The method may also comprise obtaining an equivalent isotropic and homogeneous curve for the set of data from the borehole analysis and inputting the smooth curve and the equivalent isotropic and homogeneous curve into a classifier. The method may also comprise performing a synthetic dispersion analysis and feeding results to the classifier and outputting dispersion types of the data from the classifier.

In another example embodiment, the method may be performed wherein two machine-learning automatic dipole curves are used in the approach.

In another example embodiment, the method may be performed wherein four machine-learning automatic dipole curves are used in the approach.

In another example embodiment, the method may be performed wherein the classifier is an artificial intelligence-based classifier.

In another example embodiment, the method may be performed wherein the artificial intelligence-based classifier is a machine learning artificial intelligence-based classifier.

In another example embodiment, the method may be performed wherein the set of data includes fast and slow dipole waveforms.

In another example embodiment, the method may be performed wherein the processing of the set of data uses Prony's method or other dispersion analysis methods.

In another example embodiment, a computer readable storage medium having data stored therein representing software executable by a computer, the software including instructions for classifying data per a method is disclosed. The method may comprise obtaining a set of data from a borehole analysis, using a dispersion analysis method, processing the set of data from the borehole, determining scattered dispersion points from the processing of the set of data from the borehole and extracting the scattered dispersion points as a smooth curve through a machine-learning automatic dipole interpretation approach. The method may further comprise obtaining an equivalent isotropic and homogeneous curve for the set of data from the borehole analysis and inputting the smooth curve and the equivalent isotropic and homogeneous curve into a classifier. The method may also comprise performing a synthetic dispersion analysis and feeding results to the classifier; and outputting dispersion types of the data from the classifier.

In another example embodiment, the medium may be configured to perform wherein two machine-learning automatic dipole curves are used in the approach.

In another example embodiment, the medium may be configured to perform wherein four machine-learning automatic dipole curves are used in the approach.

In another example embodiment, the medium may be configured to perform wherein the set of data includes fast and slow dipole waveforms.

In another example embodiment, the medium may be configured to perform wherein the processing of the set of data uses Prony's method or other dispersion analysis methods.

Language of degree used herein, such as the terms "approximately," "about," "generally," and "substantially" as used herein represent a value, amount, or characteristic close to the stated value, amount, or characteristic that still performs a desired function or achieves a desired result.

For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A method of automatically classifying sonic data comprising:

obtaining a set of sonic data from a borehole measurement of a borehole;

using a dispersion analysis method, processing the set of sonic data from the borehole measurement;

determining scattered dispersion points from the processing;

extracting the scattered dispersion points as a smooth curve through a machine-learning automatic dipole interpretation approach, wherein a fast curve, a slow curve, a fast equivalent isotropic and homogeneous curve, and a slow equivalent isotropic and homogeneous curve are used in the machine-learning automatic dipole interpretation approach;

obtaining an equivalent isotropic and homogeneous curve for the set of sonic data from the processed borehole measurement;

inputting the smooth curve and the equivalent isotropic and homogeneous curve into a classifier; and outputting dispersion types of the sonic data from the classifier.

2. The method according to claim 1, wherein the set of sonic data includes fast and slow dipole waveforms.

3. The method according to claim 1, wherein the processing of the set of sonic data uses Prony's method or other dispersion analysis method.

4. The method according to claim 1, wherein the classifier is an artificial intelligence based classifier.

5. The method according to claim 1, wherein the classifier can output different classification types including borehole ovality, stress induced anisotropy, vertical transverse isotropy, titled transverse isotropy, overlay with alteration or gas, and isotropic.

6. The method according to claim 4, wherein the artificial intelligence-based classifier is a machine learning artificial intelligence based classifier.

7. The method according to claim 1, further comprising:

performing a synthetic dispersion analysis prior to the outputting dispersion types of the sonic data from the classifier.

8. The method according to claim 7, wherein the synthetic dispersion analysis is used by the classifier as training data.

9. The method according to claim 1, wherein outputting dispersion types of the data from the classifier comprises outputting a strength of each dispersion type.

10. The method according to claim 1, comprising determining a logging tool is centered within the borehole based on the dispersion types.

11. A method of automatically classifying data comprising:

obtaining a set of data from a borehole measurement;

using a dispersion analysis method, processing the set of data from the borehole measurement;

determining scattered dispersion points from the processing of the set of data from the borehole measurement;

extracting the scattered dispersion points as a smooth curve through a machine-learning automatic dipole interpretation approach, wherein a fast curve, a slow curve, a fast equivalent isotropic and homogeneous curve, and a slow equivalent isotropic and homogeneous curve are used in the machine-learning automatic dipole interpretation approach;

obtaining an equivalent isotropic and homogeneous curve for the set of data from the processed borehole measurement;

inputting the smooth curve and the equivalent isotropic and homogeneous curve into a classifier;

performing a synthetic dispersion analysis and feeding results to the classifier as training data; and outputting dispersion types of the data from the classifier.

12. The method according to claim 11, wherein the classifier is an artificial intelligence-based classifier.

13. The method according to claim 12, wherein the artificial intelligence-based classifier is a machine learning artificial intelligence-based classifier.

14. The method according to claim 11, wherein the set of data includes fast and slow dipole waveforms.

15. The method according to claim 11, wherein the processing of the set of data uses Prony's method or other dispersion analysis methods.

16. The method according to claim 11, wherein the classifier outputs a classification type comprising borehole ovality, stress-induced anisotropy, vertical transverse isotropy, titled transverse isotropy, overlay with alteration or gas, or isotropic.

17. A non-transitory computer readable storage medium having data stored therein representing software executable by a computer, the software including instructions for classifying data per a method, the method comprising:

obtaining a set of data from a borehole analysis of a borehole;

using a dispersion analysis method, processing the set of data from the borehole analysis;

determining scattered dispersion points from the processing of the set of data from the borehole analysis;

extracting the scattered dispersion points as a smooth curve through a machine-learning automatic dipole interpretation approach, wherein a fast curve, a slow curve, a fast equivalent isotropic and homogeneous curve, and a slow equivalent isotropic and homogeneous curve are used in the machine-learning automatic dipole interpretation approach;

obtaining an equivalent isotropic and homogeneous curve for the set of data from the borehole analysis;

inputting the smooth curve and the equivalent isotropic and homogeneous curve into a classifier;

performing a synthetic dispersion analysis and feeding results to the classifier; and outputting dispersion types of the data from the classifier.

18. The non-transitory computer readable storage medium according to claim 17, wherein the set of data includes fast and slow dipole waveforms.

19. The non-transitory computer readable storage medium according to claim 17, wherein the processing of the set of data uses Prony's method or other dispersion analysis method.

20. The non-transitory computer readable storage medium according to claim 17, wherein outputting dispersion types of the data from the classifier comprises outputting a strength of each dispersion type.

21. The non-transitory computer readable storage medium according to claim 17, wherein the method determining a logging tool is centered within the borehole based on the dispersion types.

* * * * *